United States Patent [19]

Console et al.

[11] 3,939,134

[45] Feb. 17, 1976

[54] CATALYTIC PROCESS FOR PREPARING POLYMERS AND COPOLYMERS OF ACRYLONITRILE

[75] Inventors: Luciano Console, Mirano (Venice); Alessandro Zecchin, Sassari; Antonio Quarta, Porto Torres (Sassari), all of Italy

[73] Assignee: Societa' Italiana Resine S.I.R. S.p.A., Milan, Italy

[22] Filed: July 8, 1974

[21] Appl. No.: 486,736

[30] Foreign Application Priority Data
July 6, 1973 Italy .................................. 26266/73

[52] U.S. Cl. ...... 260/85.5 R; 260/32.6 N; 260/63 N; 260/78.5 B; 260/79.3 M; 260/88.7 C
[51] Int. Cl.² ...................... C08F 3/76; C08F 15/22
[58] Field of Search..... 260/85.5 R, 85.5 M, 85.5 F, 260/85.5 D, 85.5 P, 88.7 R, 88.7 C, 88.7 D, 88.7 G

[56] References Cited
UNITED STATES PATENTS

| | | | |
|---|---|---|---|
| 2,750,357 | 6/1956 | Bredereck et al. | 260/88.7 D |
| 3,065,212 | 11/1962 | Milford et al. | 260/85.5 R |
| 3,174,954 | 3/1965 | Nakayama et al. | 260/85.5 R |
| 3,635,927 | 1/1972 | Johnston | 260/85.5 M |

Primary Examiner—Harry Wong, Jr.
Attorney, Agent, or Firm—Sughrue, Rothwell, Mion, Zinn & Macpeak

[57] ABSTRACT

A method of polymerizing acrylonitrile monomer or copolymerizing a mixture of acrylonitrile monomer and further ethylenically unsaturated monomer copolymerizable therewith which comprises contacting in an aqueous medium the monomer of mixture of monomers with a catalytic system comprising hydrogen perioxide, a water-soluble salt of a hydroxylamine mono- or disulfonic acid and a water-soluble salt of a variable valence metal, such as a ferrous salt.

12 Claims, No Drawings

CATALYTIC PROCESS FOR PREPARING POLYMERS AND COPOLYMERS OF ACRYLONITRILE

BACKGROUND OF THE INVENTION

1. Field of the Invention

The invention relates to a process for preparing polyacrylonitrile and copolymers of acrylonitrile which are particularly suitable for processing into fibers.

The invention further relates to an active catalytic system for use in such polymerization and copolymerization reactions.

2. Description of the Prior Art

It is known that polyacrylonitrile and the copolymers of acrylonitrile containing the latter in a proportion of at least 85% by weight are widely used in the art, more particularly in the manufacture of fibers.

Such polymers are prepared in the art by polymerization of acrylonitrile or by copolymerization of acrylonitrile with one or more ethylenically unsaturated compounds copolymerizable therewith, using suitable catalysts and normally operating in an aqueous polymerization medium.

More particularly, useful catalysts include peroxide compounds generally, such as benzoyl peroxide and alkali metal or ammonium persulphates, or combinations of such compounds with substances of a reducing character, known as redox couples.

Other known catalytic systems comprise derivatives of hydroxylamine as oxidants in combination with reducing agents consisting of salts of metals in reduced form or inorganic compounds of tetravalent sulphur.

Known polymerization processes do not always lead to polymers of acrylonitrile of fully satisfactory properties.

Thus, for instance, when copolymerizing two or more monomers, difficulties are encountered in obtaining homogeneous polymerization products.

Moreover, various catalysts among those described above exhibit effectiveness in such a range of polymerization temperatures that the resulting polymers are of lower standards.

In other cases, improved polymers can be obtained only when polymerizing within such a range of temperatures that the reaction speeds are so low as to make the polymerization process impracticable or at least uneconomical.

On the other hand, it is known that the properties of fibers obtained from polymers and copolymers of acrylonitrile depend upon the properties conferred to the polymers or copolymers, such as molecular weight, distribution of molecular weights, structure and the like.

It was attempted in the art to attain such properties either by the choice of the catalytic system or by introducing special expedients in the polymerization process.

Thus, in accordance with certain known processes the polymerization is carried out in a plurality of steps in which the parameters, such as the pH and the temperature of the reaction medium, are maintained at different values, with the disadvantage of necessarily adjusting various parameters at the plurality of reaction steps.

Therefore, in preparing polymers and copolymers of acrylonitrile, problems arise relating to the progress of polymerization and also to the nature of the resulting polymers. In known processes, the requirements for inexpensiveness and simplicity of the process are hardly to be reconciled with those relating to imparting properties which make the polymers suitable for processing into high grade fibers.

The above drawbacks are avoided or at least minimized by the process of the invention which is essentially based on the use of a new catalytic system for the polymerization of acrylonitrile or copolymerization of the latter with further ethylenically unsaturated monomers.

SUMMARY OF THE INVENTION

An object of this invention is, therefore, to provide a process for the polymerization and copolymerization of acrylonitrile.

A further object of the invention is to provide a new active catalytic system for use in such as polymerization or copolymerization process.

A still further object of the invention is to provide a process for polymerization or copolymerization of acrylonitrile which can be carried out in an easily controllable and inexpensive manner, thereby making the process suitable for a large scale production of acrylonitrile polymers and copolymers.

A further object of the invention is to obtain acrylonitrile polymers and copolymers of uniform and constant composition, from which mechanically strong fibers with improved color and heat stability properties may be obtained.

Further objects and advantages of the invention will result from the following description.

DETAILED DESCRIPTION OF THE INVENTION

According to the process of the invention, the polymerization of acrylonitrile monomer or copolymerization of a mixture of acrylonitrile monomer with further ethylenically unsaturated monomers copolymerizable therewith is carried out by contacting the monomer or mixture of monomers in an aqueous medium at a temperature from 40° to 70°C with a catalytic system comprising:

hydrogen peroxide
a hydroxylamine mono- or disulfonate
a salt of a variable valence metal.

The water soluble salts of the hydroxylamine mono- and disulfonic acids, such as the alkali metal salts, are preferably used as sulfonates.

Amongst the variable valence metals, iron, which is supplied to the polymerization medium in the form of a ferrous salt such as ferrous sulphate or, anyhow, in the form of a water-soluble salts bivalent iron, is preferred.

The derivatives of hydroxylamine act as reducing agents in the catalytic system of the invention, this function being performed only when the catalytic system also includes a salt of the variable valence metal.

Merely combining hydrogen peroxyde with the hydroxylamine derivative will not afford any appreciable polymer production speed when operating under the conditions of this invention. The salt of the variable valence metal is, therefore, believed to act as an electron transfer agent in the oxydation-reduction reaction.

The monomers which can be copolymerized with acrylonitrile belong to a wide class of ethylenically unsaturated compounds such as vinyl acetate, methyl vinyl ketone, methyl acrylate, methyl methacrylate, dimethyl itaconate, butyl methacrylate, butyl acrylate, diethyl maleate, vinyl trimethyl acetate, methacrylonitrile, styrene, vinyl ethylhexyl ether, octyl methacrylate, alpha-methylstyrene, 4-methoxystyrene, ethylene sulfonic acid, allyl sulfonic acid, methallyl sulfonic acid, halogenated monoethylene compounds and N-vinyl compounds. Two or more of the compounds can be copolymerized with acrylonitrile, if desired.

The preferred copolymers for the purposes of the invention are those containing acrylonitrile in a proportion of 85 to 95% by weight, methyl acrylate, vinyl acetate, styrene or methyl vinyl ketone in a proportion of 4 to 14% by weight and a copolymerizable sulfonate such as sodium or potassium styrene sulfonate or sodium methallyl sulfonate in a proportion of 0.1 to 5% by weight.

The objects of the invention are advantageously fulfilled by employing the catalytic system in a molar ratio of hydrogen peroxide to hydroxylamine sulfonate from 0.05:1 to 20:1 and a molar ratio of hydrogen peroxide to the ferrous salt from $1:10^{-3}$ to $1:10^{-6}$. The preferred values of the ratios are from 0.1:1 to 10:1 and $1:10^{-4}$ to $1:10^{-5}$, respectively.

The objects of the invention are further advantageously fulfilled by employing in the reaction medium the catalytic system in a proportion of 0.05 to 5, preferably 0.2 to 3 parts by weight to 100 parts by weight monomer or mixture of monomers.

The preferred temperature in the polymerization or copolymerization medium is of the order of 50°C.

Moreover, the conversion of the monomer or mixture of monomers should advantageously not exceed a value of 85%, and conversion values of the order of 40–70% are preferred.

The necessary period of time for reaching the above-mentioned conversion values depends upon the selected temperature, the concentration of monomers, the catalyst concentration, etc. Generally, the polymerization or copolymerization time is from 5 minutes to 12 hours.

The polymerization or copolymerization reaction can be carried out by employing conventional means, allowing a uniform distribution of the monomers and reaction products in the reaction medium.

It is therefore advisable to operate in a medium which is stirred and in which the overall concentration of the monomer or mixture of monomers and polymer or copolymer is from 10 to 40% by weight.

The polymerization or copolymerization can be carried out discontinuously or, preferably, continuously with two or more reactors in series with one another.

In any case, on completion of polymerization or copolymerization the polymer or copolymer is conveniently separated from the aqueous medium by filtering or centrifuging, then washed and dried by normal techniques.

EXAMPLE 1

A polymerization reactor is employed, having glazed inner walls, equipped with a mechanical stirrer and a heat exchange jacket. The reactor is charged with 500 parts deionized water, 100 parts acrylonitrile, 1.5 ml hydrogen peroxide (36% volume), 1 part of potassium hydroxylamine disulfonate dihydrate and 0.0001 parts ferrous sulphate. The parts are by weight.

Upon flushing the reactor by means of a nitrogen flow, the mass is heated to 50°C and stirred at this temperature for 4 hours, until a polymer slurry of pH 2.7 is obtained. The slurry is filtered, then thoroughly washed with water, again filtered, the solids being then dried at 80°C in air, yielding a white polymer. The conversion value of the monomer into the corresponding polymer is 45%, the polymer having an specific viscosity of 0.129 (this value being determined at 25°C in a solution of 0.1 g polymer for each 100 ml dimethylformamide).

The polymer is dissolved in dimethylacetamide at 80°C to yield a solution containing 29 g polymer for each 100 ml solvent.

The solution is then extruded at a speed of 1 meter/minute in a 45% by weight dimethylacetamide aqueous solution. The extruded fibers are washed, then drawn to four times their length in boiling water and finally dried. The resulting 2.8 denier fibers show satisfactory physical and color properties.

EXAMPLE 2

The procedure of Example 1 is followed, the reactor being charged with 500 parts deionized water, 92 parts acrylonitrile, 8 parts methyl acrylate, 3 ml 36% by volume hydrogen peroxide, 1 part potassium hydroxylamine disulfonate dihydrate and 0.0001 parts ferrous sulfate. The parts are by weight.

The temperature is maintained for 4 hours at 55°C, the mass being stirred till a copolymer slurry of pH 2.4 is obtained. The slurry is filtered, thoroughly washed with water, again filtered and the solids are dried at 80°C in air, yielding a white copolymer.

The copolymer yield is 45% with respect to the overall monomers charge. The specific viscosity of the polymer is 0.130 measured under the conditions of Example 1.

The copolymer is dissolved in dimethylacetamide at 90°C, the resulting solution containing 28 g copolymer for each 100 ml solvent.

The solution is extruded at a speed of 5 meter/minute in a 55% dimethylacetamide aqueous solution. The extruded fibers are washed, drawn to 7 times their length in boiling water and dried. After a treatment at 130°C with saturated steam, 4.1 denier fibers are obtained having a tenacity of 2.6 g/denier and an elongation at break of 48%. The fibers are, moreover, of a satisfactory original color and excellent heat stability.

EXAMPLE 3

The procedure of Example 1 is again followed. The reactor is charged with 500 parts deionized water, 90 parts acrylonitrile, 10 parts vinyl acetate, 6 ml 36% by volume hydrogen peroxide, 1 part potassium hydroxylamine disulfonate dihydrate and 0.0002 parts ferrous sulphate. The temperature is maintained for 4 hours at 55°C while stirring the mass until a slurry of pH 2.4 is obtained. The slurry is then filtered, thoroughly washed with water, again filtered, and the solids are dried at 80°C in air, yielding a white copolymer. The copolymer yield is 62% with respect to the overall monomers feed.

The specific viscosity of the copolymer is 0.220 measured under the conditions of Example 1. The copolymer is dissolved in dimethylacetamide at 95°C to yield a solution containing 17 g copolymer for each 100 ml solvent. The solution is extruded at a speed of 4 meter/minute in a 45% dimethylacetamide aqueous solution.

The extruded fibers are washed, drawn to four times their length in boiling water and dried. After a treatment at 135°C in saturated steam, 2.9 denier fibers are obtained which are of a tenacity of 2.4 g/denier and an elongation at break of 42%.

EXAMPLE 4

The procedure of Example 1 is again followed. The reactor is charged with 500 parts deionized water, 92 parts acrylonitrile, 8 parts styrene, 12 ml 36% by volume hydrogen peroxide, 2 parts potassium hydroxylamine disulfonate dihydrate and 0.0001 parts ferrous sulphate. The parts are by weight.

The mass is stirred for 4 hours at a temperature of 60°C to yield a copolymer slurry of pH 2.4. The slurry is filtered, thoroughly washed with water, again filtered, and the resulting solids then dried at 80°C in air, yielding a white copolymer. The monomers conversion into the corresponding copolymer has a value of 68%.

The specific viscosity of the copolymer is 0.160, its determination being effected as described in the first example.

The copolymer is dissolved in dimethylacetamide at 90°C and a solution containing 21 g polymer for each 100 ml solvent is obtained. The solution is then extruded at a speed of 6 meter/minute in a 50% by weight dimethylacetamide aqueous solution. The extruded fibers are washed, drawn to 5 times their length in boiling water and dried. After treatment at 125°C with saturated steam, 3.6 denier fibers are obtained of a tenacity of 2.7 g/denier and an elongation at break of 39%.

What we claim is:

1. The method of polymerizing a monomer composition containing at least 85% by weight of acrylonitrile and up to 15% by weight of a further ethylenically unsaturated monomer copolymerizable therewith, which method comprises contacting the monomer composition in a aqueous medium at a temperature from 40° to 70°C with a catalytic composition comprising hydrogen peroxide, a water-soluble salt of a hydroxylamine mono- or di-sulfonic acid and a water-soluble ferrous salt, wherein the proportion of said catalytic system is from 0.05 to 5 parts by weight to 100 parts by weight of said monomer composition, wherein the molar ratio of said hydrogen peroxide to said sulfonic acid salt is from 0.05:1 to 20:1, and wherein the molar ratio of said hydrogen peroxide to said ferrous salt is from $1:10^{-3}$ to $1:10^{-6}$.

2. The method set forth in claim 1, wherein said water-soluble salt of a hydroxylamine mono- or di-sulfonic acid is an alkali metal salt thereof.

3. The method set forth in claim 1, wherein said molar ratio of said hydrogen peroxide to said ferrous salt is from $1:10^{-4}$ to $1:10^{-5}$.

4. The method set forth in claim 1, wherein said molar ratio of said hydrogen peroxide to said sulfonic acid salt is from 0.1:1 to 10:1.

5. The method set forth in claim 1, wherein said proportion of said catalytic system to said monomer composition is from 0.2 to 3 parts by weight.

6. The method set forth in claim 1, wherein said polymerization is carried out at a temperature of about 50°C.

7. The method set forth in claim 1, wherein said polymerization time is from 5 minutes to 12 hours.

8. The method set forth in claim 1, wherein said monomer or mixture of monomers are converted up to a value not exceeding 85%.

9. The method set forth in claim 8, wherein the conversion value is from 40 to 70%.

10. The method set forth in claim 1, wherein the overall concentration of said monomer or mixture of monomers and polymer in said aqueous medium is from 10 to 40% by weight.

11. The method of polymerizing a monomer composition containing at least 85% by weight acrylonitrile and up to 15% by weight of another ethylenically unsaturated monomer copolymerizable therewith, which comprises the steps of providing an aqueous medium comprising the monomer or mixture of monomer and a catalytic system comprising an alkali metal salt of hydroxylamine mono- or disulfonic acid, hydrogen peroxide and a water soluble ferrous salt with a molar ratio of hydrogen peroxide to the salt of hydroxylamine mono- or disulfonic acid from 0.05: to 20:1 and a molar ratio of hydrogen peroxide to the ferrous salt from $1:10^{-3}$ to $1:10^{-6}$, said catalytic system being in a proportion of from 0.05 to 5 parts by weight to 100 parts by weight monomer or mixture of monomers, thereby contacting the monomer or mixture of monomers with the catalytic system in the aqueous medium while operating at a temperature from 40° to 70°C for a period of time from 5 minutes to 12 hours without exceeding a conversion value of 85%, the overall concentration of the monomer or mixture of monomers and polymer in the aqueous medium being from 10 to 40% by weight.

12. The method set forth in claim 11, wherein the molar ratio of hydrogen peroxide to the salt of hydroxylamine mono- or disulfonic acid is from 0.1:1 to 10:1, the molar ratio of hydrogen peroxide to the ferrous salt is from $1:10^{-4}$ to $1:10^{-5}$, the proportion of the catalytic system is from 0.2 to 3 parts by weight, the temperature of the aqueous medium is about 50°C and the conversion value of the monomer or mixture of monomers is from 40 to 70%.

* * * * *